United States Patent [19]

Panarelli et al.

[11] Patent Number: 5,054,426
[45] Date of Patent: Oct. 8, 1991

[54] EXPANDABLE ANIMAL ENCLOSURE

[76] Inventors: Ronald J. Panarelli, 67 Edwards St., Quincy, Mass. 02169; Michael Kelly, 86 Glendale Rd., Braintree, Mass. 02184

[21] Appl. No.: 538,156

[22] Filed: Jun. 14, 1990

[51] Int. Cl.⁵ .............................................. A01K 1/03
[52] U.S. Cl. ........................................ 119/17; 119/19
[58] Field of Search ...................... 119/17, 19; 190/21, 190/22, 107, 15 R, 105

[56] References Cited

U.S. PATENT DOCUMENTS

| | | | |
|---|---|---|---|
| 1,303,736 | 5/1919 | Speicher | 119/19 |
| 1,449,428 | 3/1923 | McGaffee | 119/19 |
| 2,470,223 | 5/1949 | Powels | 119/19 |
| 2,699,848 | 1/1955 | Kaplan | 190/20 X |
| 4,760,816 | 8/1988 | Rhodes | 119/1 |
| 4,776,300 | 10/1988 | Braddock | 119/1 |
| 4,788,934 | 12/1988 | Fetter | 119/1 |
| 4,793,286 | 12/1988 | Buxton | 119/19 |
| 4,844,215 | 7/1989 | Ambasz | 190/104 X |

FOREIGN PATENT DOCUMENTS

| | | | |
|---|---|---|---|
| 0498303 | 6/1930 | Fed. Rep. of Germany | 190/22 |
| 3439279 | 4/1986 | Fed. Rep. of Germany | 119/19 |
| 2569084 | 2/1986 | France | 119/1 |
| 244529 | 4/1947 | Switzerland | 119/19 |
| 195794 | 4/1923 | United Kingdom | 119/19 |
| 0295247 | 8/1928 | United Kingdom | 190/105 |
| 369225 | 3/1932 | United Kingdom | 119/19 |

Primary Examiner—Robert P. Swiatek
Assistant Examiner—Todd E. Manahan
Attorney, Agent, or Firm—Cesari and McKenna

[57] ABSTRACT

An enclosure for animals of different sizes comprises two complementary shell housings that enclose an inner cage, which is slidably engaged to the shell housings by suitable fixtures such as track slides. In the fully closed position, the inner edges of the two shell housings meet, thereby forming a unitary enclosure. As the shell housings are drawn apart, a greater portion of the inner cage is exposed, thereby increasing the inner volume of the enclosure. In a second embodiment, the two housing shells are replaced with four partial shells that facilitate expansion in two directions.

7 Claims, 2 Drawing Sheets

EXPANDABLE ANIMAL ENCLOSURE

BACKGROUND OF THE INVENTION

A. Field of the Invention

The invention relates generally to improvements in animal housing units, and more particularly to animal carrying construction that may be expanded or collapsed to accommodate animals of varying sizes.

B. Description of the Related Art

Numerous devices have been devised to facilitate convenient transportation of individual animals. These include various forms of cages, shell-type carriers and other similar forms of enclosure. Such devices tend to fall into either of two categories: small, portable housings equipped with handles and hinged access members, and larger stand-alone cages. The first type of construction is suitable for transporting domestic pets. If the animal is not fully grown when the carrier is purchased, however, it is likely that at least one larger replacement will ultimately become necessary.

It is generally not advisable simply to procure the largest housing unit that may be conveniently transported, and which is expected to accommodate the fully grown animal. Particularly if the animal is to undergo frequent conveyance, housings that are disproportionately large compared with the animal can result in its discomfort or injury due to sliding and jostling.

Larger cage-type carriers also lack the convenience and portability of the smaller carriers. For example, most animal cages are unitary devices that lack cleaning apertures or means to assist with portage.

We are aware of some efforts to enhance the ease with which animal carriers can be stored by use of telescoping structures; see, e.g., French Patent 2,569,084. While these collapsible units may require less storage space, many utilize canvas or other fabric as an expansion material. This renders such devices unsuitable for housing animals likely to claw and tear at the carrier walls. Furthermore, these units appear to provide for only two positions—fully opened and fully closed—and therefore exhibit the same limitations as conventional carriers with respect to housing animals of different sizes.

DESCRIPTION OF THE INVENTION

Objects of the Invention

Accordingly, it is an object of the present invention to provide an animal enclosure whose dimensions can be adjusted to accommodate a wide range of animals.

It is a further object of the invention is to provide a housing construction that is easy to transport and to clean.

Another object of the invention is to provide an animal enclosure that can be easily stored.

Other objects will, in part, be obvious and will, in part, appear hereinafter. The invention accordingly comprises an article of manufacture possessing the features and properties exemplified in the constructions described herein and the apparatus embodying the features of construction, all as exemplified in the following summary and detailed description, and the scope of the invention will be indicated in the claims.

SUMMARY OF THE INVENTION

According to one aspect of the invention, therefore, an enclosure for animals of different sizes comprises two complementary shell housings that enclose an inner cage, which is slidably engaged to the shell housings by means of suitable fixtures such as track slides. The shell housings are fabricated from a resilient, preferably waterproof material such as heavy-duty plastic. At least one of the shell housings is equipped with an access member (such as a hinged door) on its outer face to admit and remove the animal, and this or the other shell housing further contains a smaller portal on one of its sides to facilitate cleaning of the interior of the enclosure.

In the fully closed position, the inner edges of the two shell housings meet, thereby forming a unitary enclosure. As the shell housings are drawn apart, a greater portion of the inner cage is exposed, thereby increasing the inner volume of the enclosure. The sliding fixtures that unite the shell housings with the inner cage produce some frictional resistance as the shell housings are drawn; this allows the housings to remain in a selected position to define an enclosure having a desired volume.

According to a second aspect of the invention, the two housing shells are replaced with four partial shells that facilitate expansion in two directions. In this case, however, a unitary inner cage construction is unsuitable. Instead, the cage is arranged in three sections. Between each of two sets of partial shells (each set, when closed, defining a shell housing as described above), a series of bars integral with the walls of the partial shells acts as a guide to facilitate expansion of the members of each set with respect to each other; the bars also act to prevent escape of the animal.

The third cage section consists of two interleaving members so as to be expandable in the same dimension as the first and second sections. This section lies between each set of partial shells. When collapsed, the third section functions in the same manner as the unitary cage described above, namely, allowing each set of partial shells to be drawn away from one another in the other dimension. The edges of this third section are also slidably (but frictionally) affixed to the inner corners of the partial shells to facilitate this movement, which defines a larger enclosure volume between the sets of partial shells. When expanded along the first dimension, this cage section cooperates with the sets of bars to define a larger enclosure along this dimension between members of each set of partial shells. The interleaving members of the third cage section and/or the sets of integral bars also produce some frictional resistance such that the expanded unit will not freely collapse into the unexpanded structure.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE INVENTION

Figure 1:
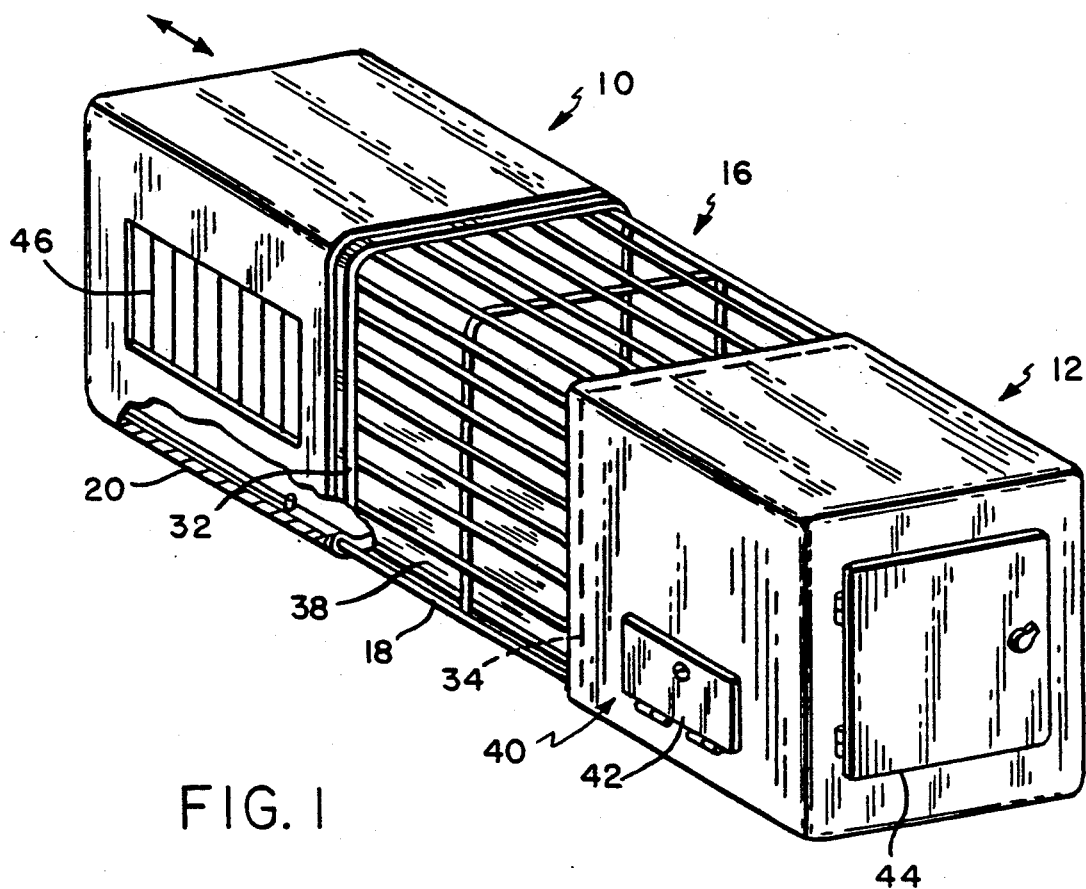
FIG. 1 is an isometric illustration of the first embodiment of the invention.

Refering first to FIG. 1, which depicts the first embodiment of the invention in its maximally expanded position. Two shell housings 10, 12 surround an inner cage 16. At least two bars 18 ("guide bars") fit slidably into complementary guide tracks 20 along the corners of cage 16. In the embodiment depicted in FIG. 1, each shell housing 10, 12 contains two such guide tracks, only one which is shown in order to preserve clarity. The number and arrangement of the guide bars can be altered to suit the practicalities of design and construction.

Figure 1A:
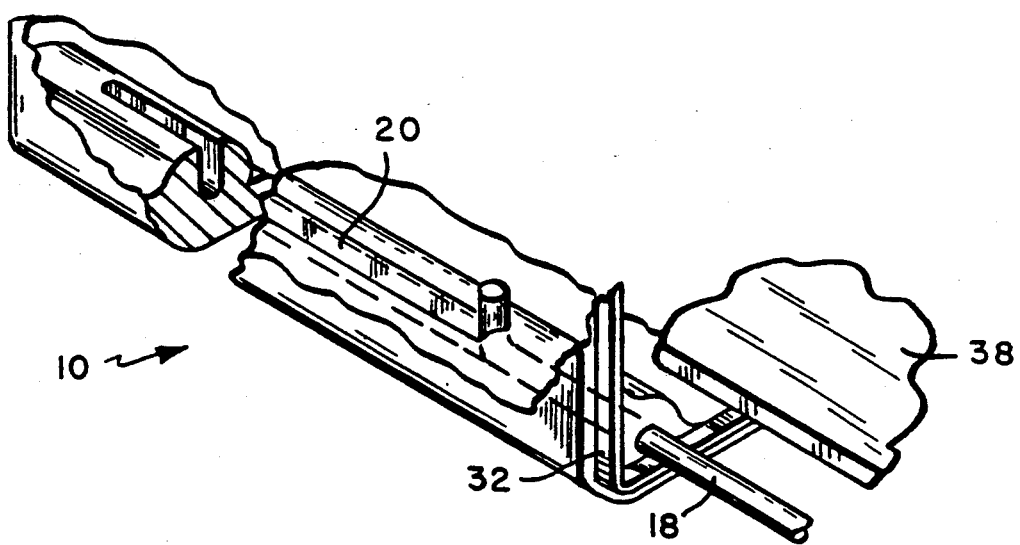
FIG. 1A is a detailed view of the guide bar and sliding track assembly.

The guide bars of cage 16 in sliding engagement with the guide tracks produce some frictional resistance as the shell housings 10, 12 are drawn apart, thereby allowing shell housings 10, 12 to remain in a selected position to define an enclosure having a desired volume. Tabs at the ends of the guide bars 18 prevent shell housings 10, 12 from being expanded beyond the length of cage 16, as shown most clearly in FIG. 1A.

Preferably, shell housings 10, 12 are fabricated from a resilient, waterproof material such as heavy-duty plastic, and molded with complementary flanges 32, 34 that fit together when shell housings 10, 12 are joined. This provides a unitary structure in the closed position.

The base of cage 16 is provided with a solid, flat support member 38. This support member, along with the bases of shell housings 10, 12 may be cleaned through a port 40, which is preferably covered by a hinged door 42. One (or both) of shell housings 10, 12 is equipped with an access member 44, which is preferably a hinged door of construction similar to that of cage 16 or shell housings 10, 12. One (or both) of shell housings 10, 12 can also be provided with a window 46 that is isolated from the outside by, for example, a series of bars. It is also possible to mold shell housings 10, 12 with suitable detents or apertures on the top panels to engage a handle when the unit is in the fully closed position; preferably, such a handle can instead engage the bars when the enclosure is expanded.

Figure 2:
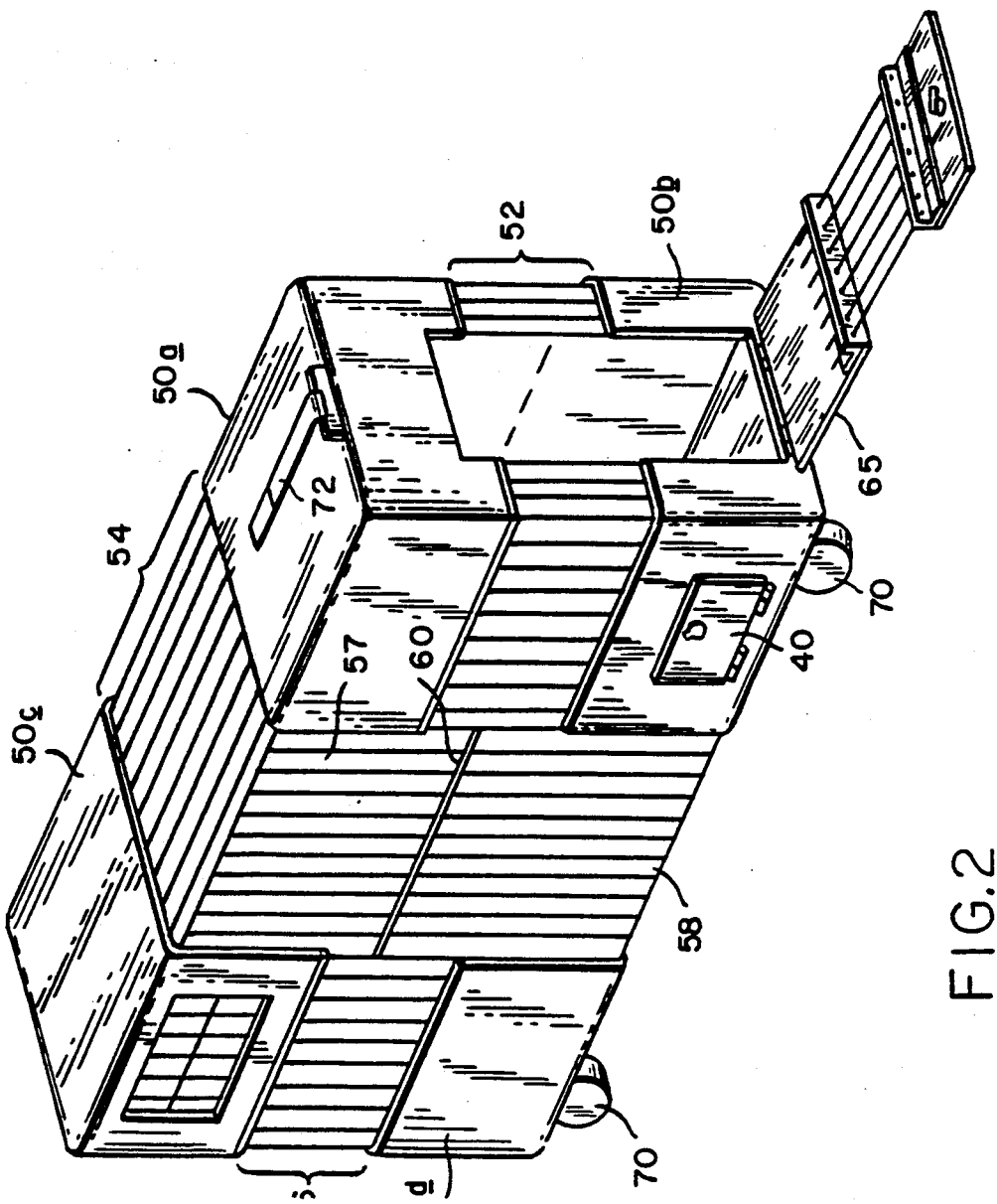
FIG. 2 is an isometric illustration of the second embodiment of the invention.

Turn now to FIG. 2, which illustrates generally the second embodiment of the present invention. In accordance therewith, four partial shells 50a, 50b, 50c and 50d facilitate expansion of the enclosure in two directions. The partial shells enclose a cage that is arranged in three sections 52, 54, 56. Cage sections 52 and 56 cooperate with partial shells 50a, 50b and 50c, 50d, respectively. Preferably, cage sections 52 and 56 comprise a series of bars integral with the walls of the respective partial shells. These bars act as guides to facilitate expansion of the members of each set with respect to one another; for purposes of clarity and to comport with the illustration of FIG. 2, this direction will be referred to as "upward", it being understood that the invention can easily be reconfigured such that cage sections 52 and 56 guide expansion in a lateral direction. Preferably, the ends of the bars are flared so that expansion cannot occur beyond a predetermined length.

Of course, other suitable configurations can be substituted to accommodate the upward expansion. The present design is advantageous in that it does not interfere with lateral movement of cage section 54, as will now be described.

Cage section 54 consists of two interleaving members 57, 58 that can be expanded vertically by drawing them apart. Members 57, 58 can be interleaved in a number of different ways. In one variation, depicted in FIG. 2, top and bottom sets of bars are offset slightly from one another. One set is affixed to a crossbar 60, and the other set extends through a series of holes in crossbar 60. The end of each bar extending through crossbar 60 is flared to prevent upward expansion beyond the length of the bars. Alternatively, one set of bars can terminate in a loop around a complementary bar on the other set, with each loop being prevented from slipping off its complementary bar by the presence of a flared end thereon.

When members 57, 58 are fully interleaved, cage section 54 functions in the same manner as the unitary cage 16 described above in connection with the first embodiment, namely, allowing each set of partial shells to be drawn away from one another materally. With this embodiment, however, such lateral movement is possible even when the partial shells are drawn vertically apart. Lateral movement is provided by slidably mounting the edges of cage section 54 within partial shells 50a, 50b, 50c and 50d, in the same fashion as described above in connection with the embodiment of FIG. 1. It is important that sliding of cage section 54 within the partial shells does not interfere with the upward movement of cage sections 52, 54; this constraint is easily accommodated if the bars of cage section 52 slide within the walls of the partial shells. Flanges can also be added to ensure alignment of the partial shells when the unit is collapsed in either or both dimensions complementary flanges analogous to those shown at 32, 34 in FIGS. 1 and 1A can be used for this purpose.

Accordingly, when expanded upwardly, cage sections 52, 54, 56 cooperate to define a taller enclosure. Interleaving members 57, 58 and/or cage sections 52, 54 produce frictional resistance such that the upwardly expanded unit will not freely collapse into the unexpanded structure.

In order to admit the larger animals that the enclosure is capable of accommodating, it is provided with at least one door 65 that is hinged on one partial shell and extends into the partial shell thereabove. Accordingly, the size of door 65 increases as the partial shells are drawn upwardly apart.

Figure 3A:
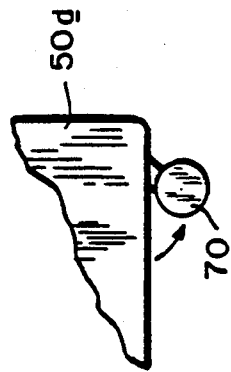
FIG. 3A is a more detailed view of the spring-loaded wheel assembly.
Figure 3B:
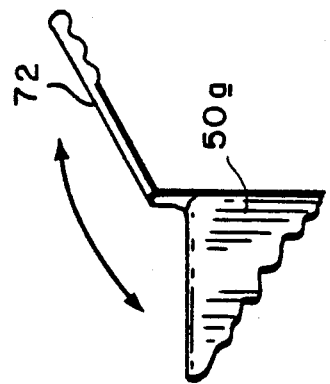
FIG. 3B is a more detailed view of the maneuvering handle assembly.

For convenience, the enclosure can be provided with spring-loaded wheels 70 as are well-known in the art and shown in the detail of FIG. 3A. These wheels are disposed in small wells, and snap into an open position when the enclosure is picked up. They can be manually reinserted into the wells as desired to promote stability of the enclosure.

Another convenience that may be added is a hinged maneuvering handle 72. This member also fits within a well when not in use, and can be drawn therefrom when needed.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

We claim:

1. An expandable animal enclosure comprising:
   a. two complementary box-like shell housings each shell housing having an open end and sidewalls;
   b. a cage comprising three sides and a base member and having two open ends, at least the ends of the cage being disposed within the open ends the shell housing, whereby slidable separation of the shell housings results in exposure of a commensurate amount of the cage.

2. The enclosure of claim 1 wherein the cage is frictionally engaged to the shell housings.

3. The enclosure of claim 1 wherein the shell housings further comprise complementary flanges to facilitate alignment thereof.

4. An animal enclosure expandable in two dimensions, comprising:
   a. first, second, third and fourth complementary partial shell housings;
   b. a series of bars disposed between the first and second, and between the third and fourth partial shell housings; and
   c. first and second complementary cage sections slidably disposed with respect to each other along a first dimension, each section being further disposed within and slidably engaged to the first and second, and to the third and fourth partial shell housings along a second dimension, whereby
   d. slidable separation of the first and second partial shell housings from the third and fourth partial shell housings results in exposure of a commensurate amount of the complementary cage sections along the second dimension, and
   e. slidable separation of the first and third partial shell housings from the second and fourth partial shell housings results in exposure of a commensurate amount of the complementary cage sections and the series of bars along the first dimension.

5. The enclosure of claim 4 wherein the first and second complementary cage members are frictionally engaged to the partial shell housings.

6. The enclosure of claim 4 wherein the first and second complementary cage members are frictionally engaged to each other.

7. The enclosure of claim 4 wherein the partial shell housings further comprise complementary flanges to facilitate alignment thereof.

* * * * *